United States Patent [19]

Spaulding

[11] Patent Number: 4,821,379
[45] Date of Patent: Apr. 18, 1989

[54] SELF-ALIGNING SPRING CLAMP

[75] Inventor: George E. Spaulding, Hinsdale, Ill.

[73] Assignee: Wittek Industries, Inc., Broadview, Ill.

[21] Appl. No.: 176,208

[22] Filed: Mar. 31, 1988

[51] Int. Cl.⁴ .................................................. B65D 63/02
[52] U.S. Cl. ............................. 24/20 TT; 24/20 R; 24/20 EE
[58] Field of Search ................ 24/20 TT, 16 R, 17 A, 24/17 B, 19, 271, 20 R, 20 CW, 20 EE, 20 W; 285/252, 921

[56] References Cited

U.S. PATENT DOCUMENTS

| 210,560 | 12/1878 | Robertshaw | 285/252 X |
| 1,378,508 | 5/1921 | Woodward | 24/20 EE |
| 1,379,476 | 5/1921 | Parr | 24/20 CW |
| 1,474,550 | 11/1923 | Philbrook | 24/20 TT X |
| 1,631,396 | 6/1927 | Beegle | 24/20 CW |
| 3,266,109 | 8/1966 | Thomas | 285/921 X |
| 3,295,176 | 1/1967 | Bright | 24/20 CW |
| 3,370,122 | 2/1968 | Ichikawa | 24/20 TT X |
| 3,435,823 | 4/1969 | Edwards | 24/20 TT X |
| 4,468,840 | 9/1984 | Sauer et al. | 24/20 TT X |
| 4,742,600 | 5/1988 | Calmettes et al. | 24/20 R |

FOREIGN PATENT DOCUMENTS

| 648535 | 7/1937 | Fed. Rep. of Germany | 24/20 EE |
| 2470275 | 6/1981 | France | 24/20 R |
| 2470276 | 6/1981 | France | 24/20 R |
| 1140249 | 1/1969 | United Kingdom | 24/20 EE |

Primary Examiner—Kenneth J. Dorner
Assistant Examiner—Laurie K. Cranmer
Attorney, Agent, or Firm—Lyman R. Lyon

[57] ABSTRACT

A circular spring clamp comprises a spring steel band having a reentrantly folded latch hook at one end and a radially outwardly extending latch at the opposite end with a concave latching surface thereon. The band has radially outwardly extending flanges on opposite edges thereof for guidance and retention of the latch hook.

1 Claim, 1 Drawing Sheet

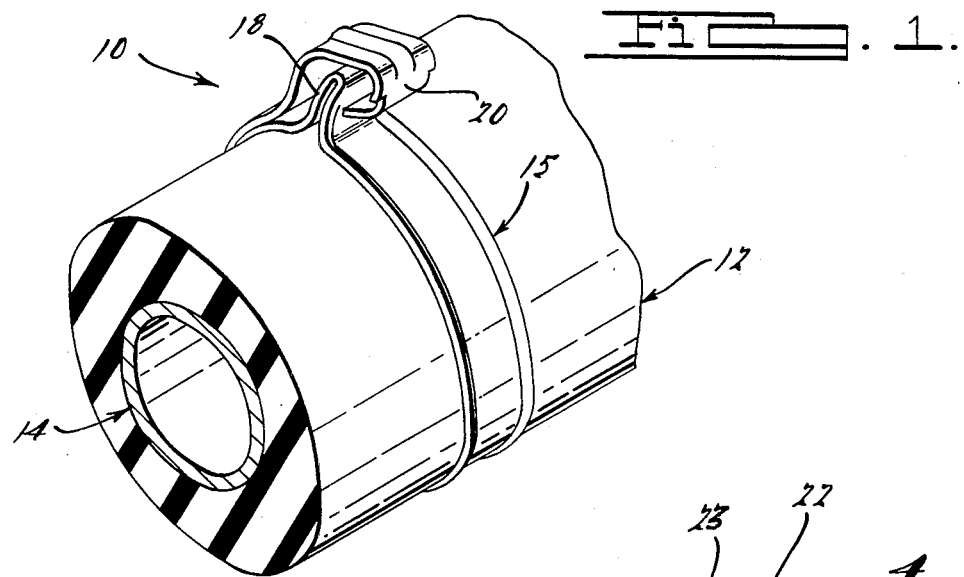
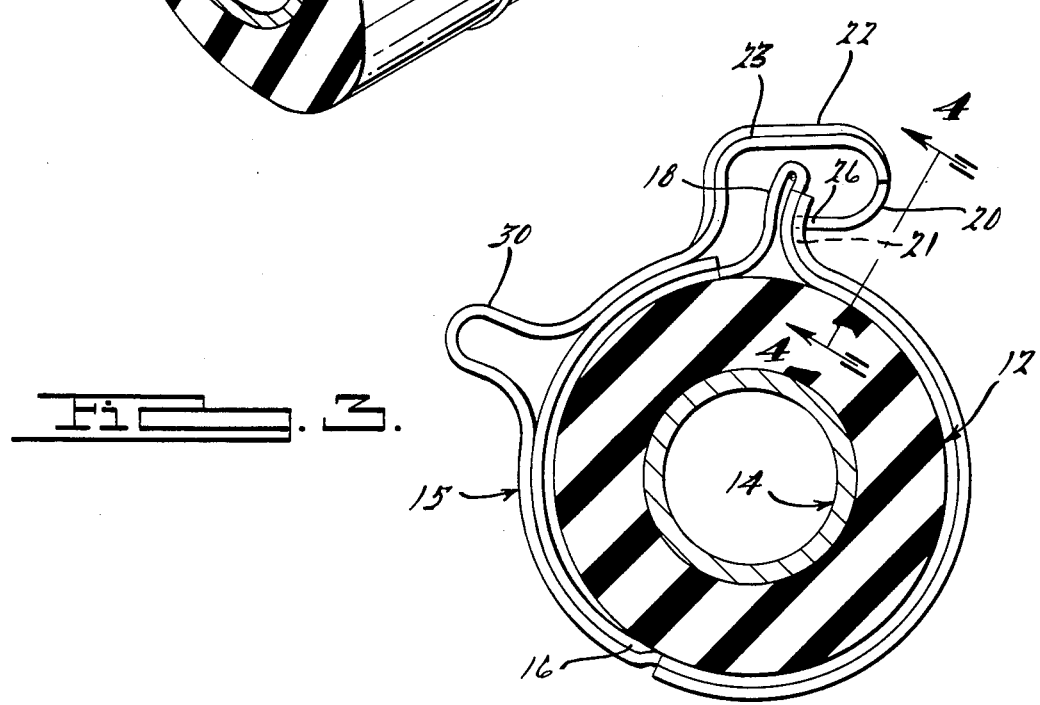
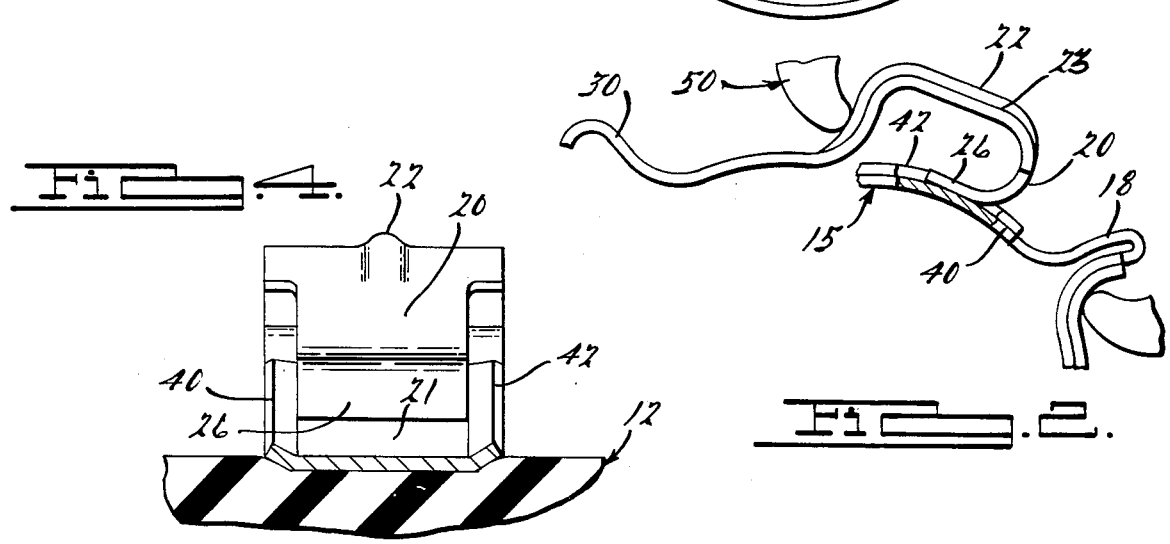

4,821,379

SELF-ALIGNING SPRING CLAMP

BACKGROUND OF THE INVENTION

Spring clamps that are openable to effect assembly about a hose are well taught in the prior art. For example, the U.S. Pat. Nos. to Bright 3,295,176; Thomas 3,266,109; Ichikawa 3,370,122; Edwards 3,435,823; Philbrook 1,474,550; Parr 1,379,476 and Robertshaw 210,560 teach an openable spring clamp having locking means to effect closure of the clamp. However, each of the clamps taught in the aforesaid patents exhibit one or more deficiencies which, in field use, limits utility of the clamp. Specifically, while the clamps taught in the aforesaid patents utilize a mechanical interlock in one form or another, experience has indicated that a guidance and retention system for the latch is highly desirable to ensure proper alignment and positive retention.

SUMMARY OF THE INVENTION

A clamp in accordance with a constructed embodiment of the instant invention comprises a flat band of steel having locking means at opposite ends thereof to effect closure of the clamp about a tube. The locking means comprises a hook at one end of the band that effects a mechanical interlock with a latch at the other end of the clamp. Ramp-type flanges on the band guide the hook into engagement with the latch and retain the hook in engagement therewith by precluding lateral movement of the hook relative to the latch.

BRIEF DESCRIPTION OF THE DRAWINGS

FIG. 1 is a perspective view of a clamp in accordance with a constructed embodiment of the instant invention;

FIG. 2 is a fragmentary view of the clamp of FIG. 1 in the open condition;

FIG. 3 is a view showing the clamp in the fully closed condition; and

FIG. 4 is a view taken along the line 4—4 of FIG. 3.

DETAILED DESCRIPTION OF THE PREFERRED EMBODIMENT OF THE INVENTION

As seen in FIG. 1 of the drawings, a spring clamp 10, in accordance with a preferred constructed embodiment of the instant invention, is disposed about a hose 12 for the retention thereof about a tube 14. The clamp 10 comprises a band 15 having a latch 18 at one end and a latch hook 20 on an opposite end. The latch hook 20 engages a radially outwardly extending concave latching surface 21 on the latch 18 in biting and mechanical locking engagement. The latch hook 20 has a radially outwardly and circumferentially extending portion 23 having a centrally disposed reinforcing rib 22 that terminates at the junction of the hook 20 with the band portion 15 of the clamp 10.

As seen in FIG. 3 of the drawing, a reentrantly folded end portion 26 of the latch hook 20 is preferably provided with a chisel edge to effect biting engagement with the latch 18 as the hook 20 moves radially inwardly along the surface 21 thereof. Thus, the hook 20 effects biting engagement as well as a mechanical lock with the latch 18. The ultimate mechanical and biting relationship between the latch hook 20 and latch 18 is best illustrated in FIG. 3 of the drawing.

In accordance with the instant invention, and as best seen in FIG. 4, the end portion 26 of the hook 20 is reduced in width so as to the accommodated between radially outwardly directed flanges 40 and 42 on opposite edges of the band 15. Initially, as seen in FIG. 2, the flanges 40 and 42 guide the end portion 26 of the latch hook 20 upon advancement thereof toward the latch 18. After the hook 20 rides over the latch 18 and engages the concave surface 21 thereof, the flanges 40 and 42 restrain the end portion 26 of the hook 20 from movement laterally of the band 15.

The clamp 10 may be provided with a tensioning loop 30 which, since band length is nonadjustable, functions to maintain tension on the clamp 10 within a given tolerance range.

Assembly of the clamp 10 about the hose 12 is initiated by drawing the latch hook 20 toward the latch 18 by a suitable pliers-type tool 50. The end portion 26 of the hook 20 is guided by the flanges 40 and 42 on the band 15 during this phase of assembly. As the latch hook 20 reaches the latch 18 it rides thereover until the biting edge thereon engages the concave surface 21 of the latch 18 in biting engagement. The hook 20 is thereafter biased radially inwardly to the fully closed position shown in FIG. 4, the flanges 40 and 42 precluding lateral movement thereof.

From the foregoing description it should be apparent that the spring clamp of the instant invention provides for positive retention of the latch hook on the latch which precludes spurious opening of the clamp.

While the preferred embodiment of the invention has been disclosed, it should be appreciated that the invention is susceptible of modification without departing from the scope of the following claims.

I claim:

1. A circular spring clamp comprising:
   a spring steel band having a latch hook at one end and a latch at the other end,
   said latch hook comprising a radially outwardly extending portion, a circumferentially extending portion, and a radially inwardly reentrantly folded portion having a terminal edge engageable with said latch,
   said latch having a concave latching surface thereon for the acceptance of the terminal edge of said latch hook,
   a pair of radially outwardly extending flanges on opposite edges of the latching surface of said latch,
   the reentrantly folded portion of said latch hook being substantially equal to the spacing between said flanges so as to the acceptable therebetween for positively positioning said latch hook.

* * * * *